(12) United States Patent
Lee et al.

(10) Patent No.: US 11,681,702 B2
(45) Date of Patent: **\*Jun. 20, 2023**

(54) CONVERSION OF MODEL VIEWS INTO RELATIONAL MODELS

(71) Applicant: SAP SE, Walldorf (DE)

(72) Inventors: Taehyung Lee, Seoul (KR); Wolfgang Stephan, Walldorf (DE); Felix Knittel, Walldorf (DE); Chuho Chang, Gyeonggi-do (KR)

(73) Assignee: SAP SE, Walldorf (DE)

( \* ) Notice: Subject to any disclaimer, the term of this patent is extended or adjusted under 35 U.S.C. 154(b) by 268 days.

This patent is subject to a terminal disclaimer.

(21) Appl. No.: 16/743,680

(22) Filed: Jan. 15, 2020

(65) Prior Publication Data

US 2020/0151180 A1 May 14, 2020

Related U.S. Application Data (63) Continuation of application No. 14/949,372, filed on Nov. 23, 2015, now Pat. No. 10,565,200.

(51) Int. Cl.
*G06F 16/24* (2019.01)
*G06F 16/2453* (2019.01)

(52) U.S. Cl.
CPC .............................. *G06F 16/24544* (2019.01)

(58) Field of Classification Search
CPC ............ G06F 16/9024; G06F 16/2456; G06F 16/2246; G06F 16/24544; G06F 16/24542; G06F 16/2458; G06F 16/24534; G06F 16/24535; G06F 16/2228; G06F 16/2428; G06F 16/22; G06F 16/244; G06F 16/322;
(Continued)

(56) References Cited

U.S. PATENT DOCUMENTS 8,086,598 B1\* 12/2011 Lamb ................ G06F 16/24544
707/606
10,565,200 B2   2/2020 Lee et al.
2004/0236762 A1\* 11/2004 Chaudhuri ........ G06F 16/24542
(Continued)

OTHER PUBLICATIONS

Gubichev et al. "D2.2.1 Analysis and classification of choke points", LDBC Cooperative project FP2-317548 , Oct. 1, 2013.

*Primary Examiner* — Apu M Mofiz
*Assistant Examiner* — Cindy Nguyen
(74) *Attorney, Agent, or Firm* — Sterne, Kessler, Goldstein & Fox P.L.L.C.

(57) ABSTRACT

Disclosed herein are system, method, and computer tangible medium embodiments for generating a relational database model from a model view that provides an estimate for generating query plan for a query on the model view, according to an embodiment. A join model of a model view set on one or more database tables is received. At least one index conversion of the join model is performed, where the index conversion converts at least one index in the join model into at least one leaf node in a relational model tree. At least one join conversion of the join model is performed where the at least one join conversion generates a node in the relational model tree that joins a first and second leaf nodes in the relational model tree. A requested parameter conversion is performed, where the requested parameter conversion includes an attribute or key figure requested by a query.

20 Claims, 6 Drawing Sheets

(58) Field of Classification Search
CPC .......... G06F 16/9027; G06F 16/24553; G06F 16/24556
See application file for complete search history.

(56) References Cited

U.S. PATENT DOCUMENTS

| | | |
|---|---|---|
| 2007/0185896 A1 | 8/2007 | Jagannath et al. |
| 2008/0195643 A1 | 8/2008 | Sheth-Voss et al. |
| 2011/0246448 A1* | 10/2011 | Tatemura .......... G06F 16/24532 707/714 |
| 2012/0290559 A1 | 11/2012 | Fuller et al. |
| 2012/0323885 A1 | 12/2012 | Wang et al. |
| 2013/0173528 A1 | 7/2013 | Betawadkar-Norwood et al. |
| 2013/0204902 A1* | 8/2013 | Wang .................. G06F 16/2365 707/797 |
| 2014/0122452 A1 | 5/2014 | Faerber et al. |
| 2014/0172914 A1* | 6/2014 | Elnikety ............. G06F 16/9024 707/774 |
| 2014/0181154 A1* | 6/2014 | Amulu .................... G06F 16/28 707/803 |
| 2016/0140175 A1 | 5/2016 | Weyerhaeuser |
| 2016/0371345 A1 | 12/2016 | Kostirev et al. |
| 2017/0053294 A1* | 2/2017 | Yang .................. G06F 16/9024 |
| 2017/0075936 A1 | 3/2017 | Noh et al. |

* cited by examiner

402   404 algorithm BUILD_QO_JOIN_TREE( in: LIST, out: TREE)
line 1. for (x,y,t, cond) in LIST:
line 2.   n := FIND_NEAREST_COMMON_ANCESTOR(x, y)
line 3.   if (n is nil):
line 4.     left := FIND_ROOT_FROM(x)
line 5.     right := FIND_ROOT_FROM(y)
line 6.     join := CREATE_JOIN(left, right, t, cond)
line 7.   else:
line 8.     ASSERT(JOIN_TYPE_OF(n) == t)
line 9.     ADD_JOIN_CONDITION(n, cond)
line 10. end for
line 11. return FIND_ROOT_FROM(x) for any x we visited

CONVERSION OF MODEL VIEWS INTO RELATIONAL MODELS

CROSS REFERENCE TO RELATED APPLICATIONS

This application claims priority to U.S. Non-Provisional patent application Ser. No. 14/949,372, titled "Conversion of Model Views Into Relational Models" and filed on Nov. 23, 2015, which is incorporated in its entirety herein.

BACKGROUND OF THE INVENTION

A multi-view database has multiple views on data, including structured query language (SQL) views, which are defined using standard SQL syntax, and model views, which are defined using graphical interfaces where a user can model relational operations on data stored in column tables as a graph. Model views, however, are interpreted as black box operators when a database optimizes and generates a query plan for a query. Because model views are interpreted as black boxes, the operators in the model views are not considered during query optimization process. As a result, the database is not aware of the internal model of a query, including the access tables, local filters, and join graphs. Additionally, the database is not aware of the statistical properties of model view, such as an estimated record count or estimated distinct value count for requested attributes or key figures. Because of these deficiencies, a database can produce a sub-optimal query plan for a query with model views.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for converting a model view on tables stored in a column store of a database into a relational tree structure that facilitates generation and optimization of a query plan.

Figure 1:
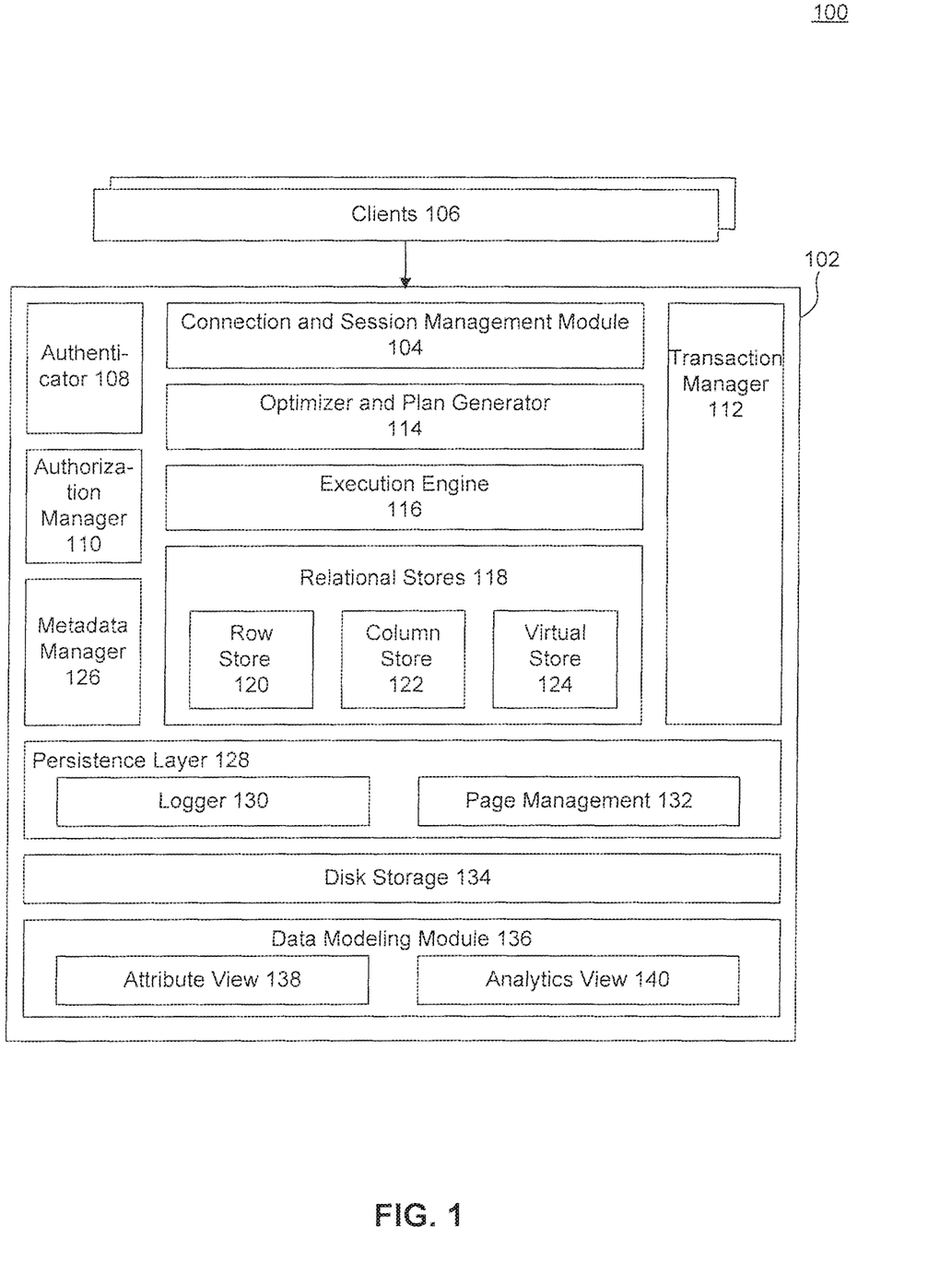
FIG. 1 is a block diagram of a database management system, according to an example embodiment.

FIG. 1 is a block diagram 100 of an exemplary database management system. Database management system 102 may be a memory-centric data management system that leverages hardware capabilities, such as vast main memory space and multi core CPU and GPU processors, described in detail in FIG. 6. In a memory-centric data management system, data, as will be discussed below, is stored in-memory and is optimized for fast storage and retrieval without loading the data from non-volatile storage components, such as, disk memory.

In an embodiment, database management system 102 includes a connection and session management module 104. Connection and session management module 104 creates and manages sessions and connections for database clients or simply clients 106. Clients 106 may be computing devices under a control of a user (also referred to as client devices) that access and/or execute business applications. Business applications are custom or generic applications that include applications related to social media, bio-informatics, and business processing, to name a few examples, and that store and manipulate data in database management system 102. These applications may be located on client 106 or on another server that has access to database management system 102 on behalf of client 106.

Once connection and session management module 104 establishes a session with database management system 102, clients 106 may use one or more database languages, to manipulate data. Database languages include a structured query language (SQL), SQL Script (a scripting language for describing application specific calculations inside the database), MultiDimensional eXpressions (MDX), WIPE (weakly structured information processing and exploration) for data graph processing and FOX (for planning applications), to give a few examples. These database languages issue queries using the respective syntaxes that add, remove, manipulate, and update the data stored in database management system 102.

In an embodiment, an established connection may be authenticated using authenticator 108. Authenticator 108 authenticates clients 106 to database management system 102. For example, authenticator 108 verifies that a user using client 106 has a necessary user name and password to access data in database management system 102.

In an embodiment, database management system 102 includes an authorization manager 110. Authorization manager 110 determines whether a user has the required privileges to execute the requested operations. A privilege grants a right to perform a specified operation (such as create, update, select, or execute).

Transaction manager 112 is a component that coordinates transactions, controls transactional isolation, and keeps track of active and committed transactions.

In an embodiment, client 106 may issue a client request (such as a query) to database management system 102. The client request may manipulate one or more rows in a table of a database management system 102. For example, the client request may insert, update, or delete data from a particular row of a table.

When database management system 102 receives a client request, the client request may initially be processed in accordance with the language of the client request, such as SQL, SQL script, MDX, WIPE, FOX, etc. For example, a client request including a SQL statement may be processed using a SQL processor (not shown). The SQL processor processes structured data, such as row- and column-oriented physical representations of relational tables in database management system 102. In another example, WIPE statement may be processed using a graphics processor that processes unstructured data that is stored as data graphs.

After the initial processing, the client request may be converted into a format that is common to processing requests in database management system 102 and forwarded to an optimizer and plan generator 114. In an embodiment, optimizer and plan generator 114 parses and optimizes the client request, and also generates a query plan for executing the client request, as discussed in detail in FIG. 2. Once generated, optimizer and plan generator 114 passes the query plan to execution engine 116.

In an embodiment, execution engine 116 processes the query plan. To process the query plan, execution engine 116 accesses data stored in tables of database management system 102. Example tables may be stored in relational stores 118. Relational stores 118 may include a row store 120 and a column store 122. In an embodiment, relational stores 118 may be included in one or more memory structures that are discussed in detail in FIG. 6. In yet another embodiment, relational stores 118 may be in-memory stores. In an in-memory store row store 120 and column store 122 are stored in the volatile or RAM memory, such that, execution engine 116 does not waste time in loading data from the volatile memory (such as disk memory), and a processor (as discussed in FIG. 6) has quick access to data in row store 120 and column store 122.

In an embodiment, row store 120 stores relational tables in a row format.

In an embodiment, column store 122 stores relational tables in a column format.

In an embodiment, metadata manager 126 manages metadata in database management system 102. Example metadata includes definitions of relational tables, columns, views, indexes and procedures. In an embodiment, metadata manager 126 may be coupled to a database catalog for relational stores 118. In one embodiment, the database catalog may be stored in tables in row store 120.

In an embodiment, persistence layer 128 provides durability and atomicity to transactions. For example, persistence layer 128 ensures that data in database management system 102 is restored to the most recent committed state after a restart and that transactions are either completely executed or completely undone. To achieve this goal in an efficient way, persistence layer 128 may use a combination of write-ahead logs, shadow paging and save points. In an embodiment, persistence layer 128 also offers interfaces for writing and reading persisted data.

In an embodiment, persistence layer 128 includes a logger 130. Logger 130 logs data, changes in data, and transaction requests to a memory storage disk. Those transactions and data changes may be performed by execution engine 116.

Page management module 132 provides an interface for writing and reading data from memory cache and disk storage for processing from relational stores 118.

Disk storage 134 is a long term memory storage that stores data. For example, data stored in relational stores 118 that is no longer frequently accessed may be moved to disk storage 134. Exemplary disk storage 134 may be one of non-volatile memories that are discussed in detail in FIG. 6. When client 106 requests data in disk storage 134, database management system 102 may move the data from disk storage 134 into relational stores 118. Once moved, the database management system 102 may send the data to client 106 as part of a response message.

In an embodiment, database management system 102 also includes a data modeling module 136. Data modeling module 136 creates different modeling views on top of database tables. The modeling view may implement business logic that creates a data report. In an embodiment, a user using client 106 may use data modeling module 136 installed on client 106 (not shown) or connect to data modeling module 136 included in database management system 102 to design data modeling views with application specific business logic and also design applications that retrieve, display, update, and delete data using the business logic in the data modeling views. In a further embodiment, applications that connect to data modeling module 136 may be written HTMP, PHP, Java, and/or Excel to name a few examples.

In an embodiment, data modeling module 136 includes several types of views. Example views are attribute view 138 and analytical view 140. In an embodiment, attribute view 138 and analytical view 140 are modeling views that operate on data in column store 122. In a further embodiment attribute view 138 and analytical view 140 are defined using graphical interfaces that allow a user to model relational operators on data stored in column tables as a graph.

In an embodiment, attribute view 138 may include descriptions of join models, which are described below. In another embodiment, attribute view 138 may be used to model data like entities, such as a product, an item, an employee, a business, or a business partner.

In an embodiment, analytical view 140 may include description of join models, and also specialized join models, such as snowflakes models. A snowflake model describes a database schema where data is stored in a central fact table that is connected to multiple dimensions that categorize facts and measures in order to answer business questions and perform calculations. Data stored in tables included in snowflake models is typically normalized into new tables to avoid data redundancy. In a further embodiment, analytical view 140 may be defined on at least one table, in, for example, column store 122 that contains transactional data and may also encompass additional tables and/or attribute views 138.

In a further embodiment, analytical view 140 may be used to calculate aggregate data, such as a total number of items sold, or maximum power consumed in a given month.

In a further embodiment, analytical view 140 may be used to execute star schemas. In an embodiment, a star schema is a special case of the snowflake schema, which includes one or more central fact tables referencing multiple dimensions, but where tables are not normalized. A star schema separates business process data into facts data and dimensions data. The facts data includes the measurable, quantitative data about a business, such as sale price, quantity, time, distance, speed, and weight parameters. The dimensions data includes descriptive attributes related to the fact data, such as, different product models, colors, sizes, geographic locations, etc.

In an embodiment, a join model may be represented by a join graph. A join graph may be defined over one or more tables or indexes that point to the one or more tables. In a further embodiment, a join graph may be defined over tables in column store 122 that portray data in a set of columns. Additionally, a join model may include an index list having one or more indexes. In a further embodiment, each index in the index list may correspond to a table in column store 122.

In an embodiment, a join model may include one or more join conditions. The join conditions include a join type, such as an "inner join," "left outer join," "right outer join," and "full outer join." Additionally, the join conditions specify relationships between tables and predicates that join the tables. In a further embodiment, the one or more join conditions may be combined into a join path that includes a series of join conditions and an order for executing the join conditions.

Figure 2:
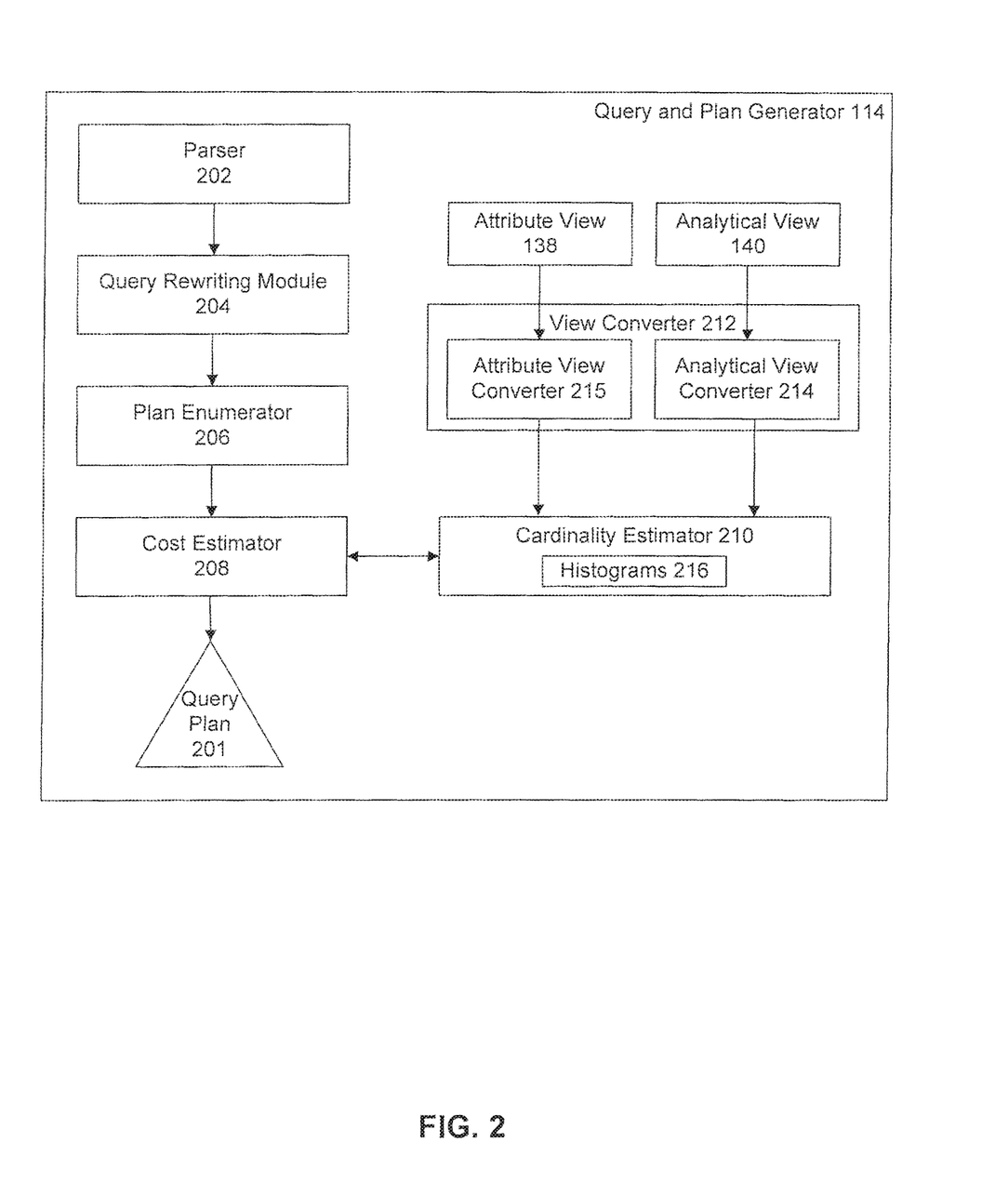
FIG. 2 is a block diagram of an optimizer and plan generator, according to an example embodiment.

In an embodiment, optimizer and plan generator 114 may perform cardinality estimation on views, such as attribute view 138 and analytical view 140. FIG. 2 is a block diagram of optimizer and plan generator 114, according to an embodiment. Optimizer and plan generator 114 generates query plan 201. To generate query plan 201, optimizer and plan generator 114 performs cardinality estimation on views that manipulate data in column store 122, such as attribute view 138 or analytical view 140. Cardinality estimation on attribute view 138 or analytical view 140 provides data that allows optimizer and plan generator 114 to generate an efficient query plan that is optimized for processing data in attribute view 138 or analytical view 140. In particular, cardinality estimation is a prediction to a statistical question used to evaluate a query, but without performing the evaluation. For example, a cardinality estimate may be a prediction of a number of rows in a query result, or number of repeated row values or null values in the query result, which may affect which query plan 201 is used to execute a query.

Optimizer and plan generator 114 includes a parser 202, a query rewriting module 204, a plan enumerator 206, a cost estimator 208, a cardinality estimator 210, and a view converter 212.

In an embodiment, parser 202 parses a query according to the semantics of the query language, and breaks the query down into query blocks. In a further embodiment, parser 202 may parse queries that are written in multiple languages.

Once parser 202 parses the query into query blocks, query rewriting module 204 rewrites the query blocks into a language that database management system 102 uses to generate query plan 201. For example, query rewriting module 204 may convert query blocks into one or more binary trees or other data structures which represents the query blocks.

In an embodiment, plan enumerator 206 uses the results generated by query rewriting module 204 to determine query plan 201 for the query. Query plan 201 retrieves and manipulates information in relational stores 118 in accordance with the query semantics. This may include choosing the access method for each table accessed, choosing the order in which to perform a join operation on the tables, and choosing the join method to be used in each join operation. As part of this process, plan enumerator 206 selects one or more query plans that can process the query and passes the selected query plan to the cost estimator 208.

In an embodiment, cost estimator 208 estimates the approximate cost of executing each query plan selected by plan enumerator 206 on all or some of the components and blocks of the query. In order to estimate the cost of executing each query plan, cost estimator 208 receives cardinality estimation from cardinality estimator 210. In a further embodiment, cardinality estimation may be in a form of one or more histograms 216. A person skilled in the art will appreciate that a histogram is a representation of data distribution.

In an embodiment, cardinality estimator 210 uses attributes of the tables, indexes, requested attributes, etc., and also the data stored in relational stores 118 to generate one or more histograms 216 that determine cardinality estimation of tables that may be accessed by query plans. Once cardinality estimator 210 completes generating one or more histograms 216, cardinality estimator 210 provides one or more histograms 216 to cost estimator 208. Cost estimator 208 uses the data distributions in histograms 216 to select a query plan 201 that may be optimal for executing a query.

In an embodiment, view converter 212 allows cardinality estimator 210 to provide cardinality estimation for different model views, such as attribute view 138 and analytical view 140. To provide cardinality estimation for model views, view converter 212 may convert models of attribute view 138 and analytical view 140, which are views on column store 122, into relational models which simulate relational operations over the column tables. Cardinality estimator 210 then produces one or more histograms 216 of the requested attributes and key figures in the converted relational models and generates cardinality estimation from one or more histograms 216.

In an embodiment, view converter 212 converts attribute view 138 and analytic view 140 into a relational join tree that can be interpreted using cardinality estimator 210. In a further embodiment, the relational join tree is a binary tree. A person skilled in the art will appreciate that in a binary tree a node has at least two child nodes, which may be referred to as a left node and a right node.

In a further embodiment, view converter 212 includes an attribute view converter 214 and an analytical view converter 215. Attribute view converter 214 converts attribute view 138 into a relational model and analytical view converter 215 converts analytical view 140 into a relational model.

Figure 3:
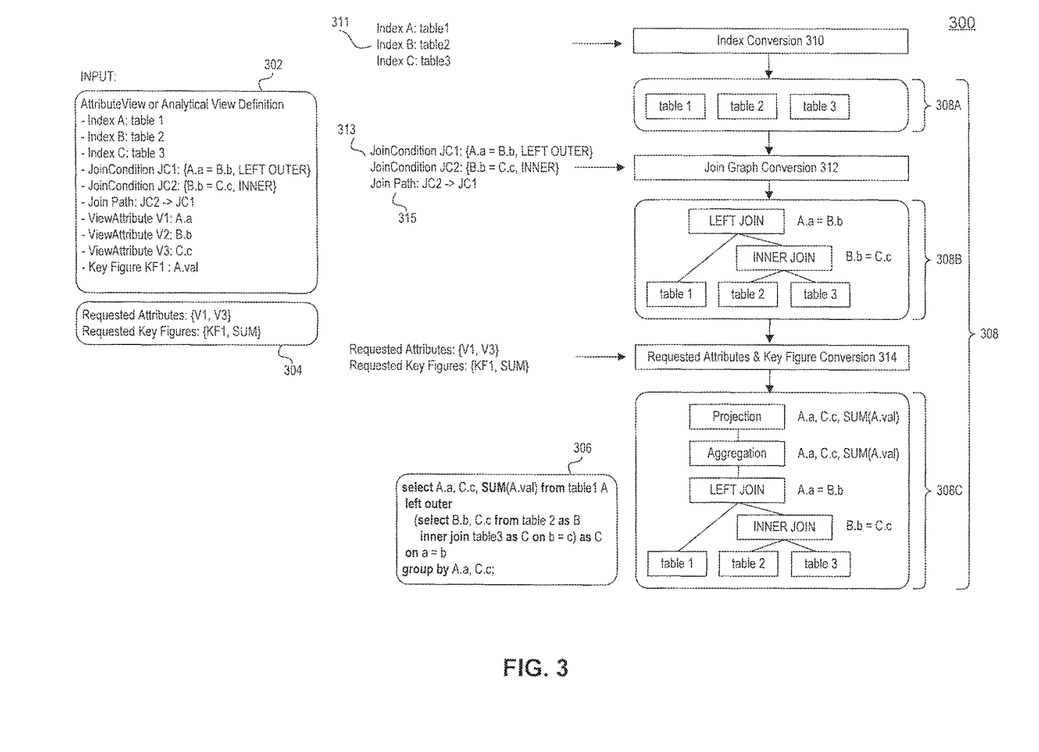
FIG. 3 is a block diagram illustrating conversion of a model view, according to an embodiment.

FIG. 3 is a block diagram 300 illustrating a conversion of a model view, according to an embodiment. Although block diagram 300 can apply to a model view, such as either attribute view 138 or analytical view 140, view converter 212 may implement additional conversion steps that are particular to each view.

In an embodiment, view converter 212 receives a view definition, such as the view definition 302 and requested parameters 304 as input for a view, such as attribute view 138 or analytical view 140. Example view definition 302 includes: indexes on tables, such as indexes A, B, and C on table1, table2, and table3, respectively; join conditions, such as JC1, and JC2; a join path for the join conditions; view attributes, such as, V1, V2, and V3 that are views on columns in indexes, such as, A.a, B.b, and C.c, respectively; and a key figure, such as, KF1, which points to A.val. In an embodiment, "a", "b", "c", and "val", are attributes of indexes A, B, and C that are mapped on table1, table2, and table3. A person skilled in the art will appreciate that view definition 302 is non-limiting, and that view converter 212 may convert other view definitions.

In an embodiment, requested parameters 304 may be view attributes and key figures that are requested by a query. For example, query 306 in FIG. 3 specifies V1 (A.a) and V3 (C.c) as requested attributes, and KF1 (A.val) and SUM as requested key figures.

In an embodiment, view converter 212 traverses through view definition 302 and converts views tables, joins and view attributes into a relational tree structure 308, which may be a relational join tree having a binary tree structure. As part of the conversion, view converter 212 performs conversion on indexes, joins, requested attributes and key figures, as discussed below.

In an embodiment, view converter 212 performs index conversion 310. In index conversion 310, view converter 212 converts indexes 311 into relational tree structure 308, as shown in tree structure component 308A. For example, in FIG. 3, index conversion 310 converts indexes A, B, and C on table1, table2, and table3 into tree structure component 308A. In an embodiment, view converter 212 converts each index in indexes 311 into a leaf node of relational tree structure 308. A person skilled in the art will appreciate that a leaf node is a node that does not have any dependent nodes.

In another example, view converter 212 performs join graph conversion 312. In join graph conversion 312, view converter 212 creates nodes out of one or more join conditions defined in view definition 302 and inserts the one or more nodes into relational tree structure 308, as shown in tree structure component 308B that includes nodes that connect the leaf nodes and are labeled with join types "inner join" and "left join." Each node created in join graph conversion 312 may also include a join type and the predicate of the join. Example predicate may be B.b=C.c or A.a=B.b as shown in tree structure component 308B.

In a further embodiment, the order of the join graph conversion may depend on join path 315, which is specified in view definition 302.

In another example, view converter 212 performs requested attributes and key figure conversion 314. In requested attributes and key figure conversion 314, view converter 212 generates one or more nodes from requested parameters 304 and adds these one or more nodes to relational tree structure 308, as shown in tree structure component 308C. In an embodiment requested attributes and key figures may be the attributes and figures that are requested in the query. Each node created in requested attributes and key figure conversion 314 may also include a view attribute and key figure as part of the node, as shown in binary tree structure 308C.

Figure 4:
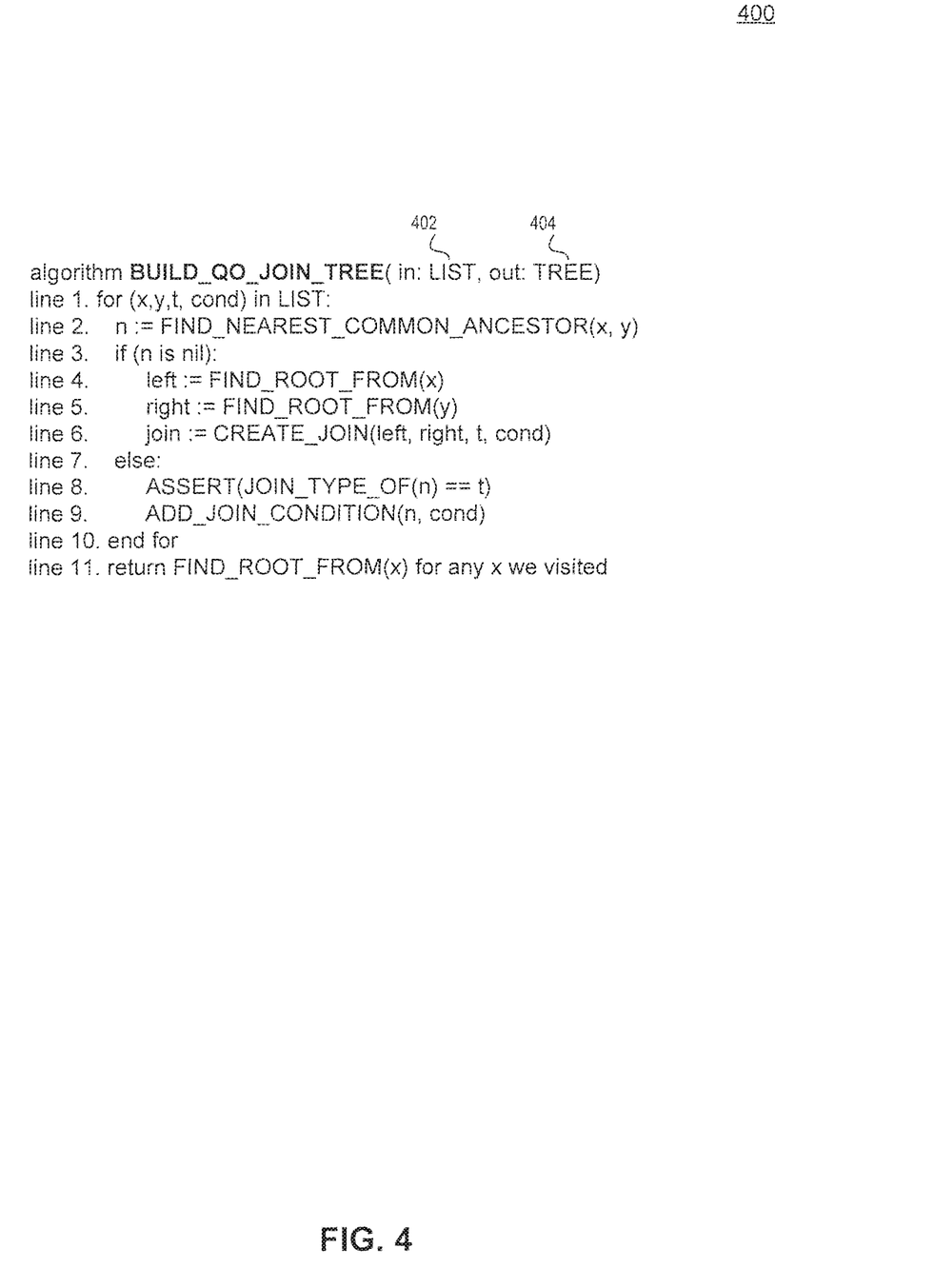
FIG. 4 is a diagram of an exemplary join graph conversion algorithm, according to an embodiment.

FIG. 4 is a diagram of an exemplary join graph conversion algorithm 400, according to an embodiment. View converter 212 may use algorithm 400 to convert a join model of a view into a relational tree structure, which may be a binary relational tree structure. In an embodiment, the view may be represented as a join graph that is defined in attribute view 138 or analytical view 140. A person skilled in the art will appreciate that a join graph includes vertices and edges. In a further embodiment the join graph may be a directed graph. A directed graph is a graph where a set of vertices are connected together by a set of edges, where all edges are directed from one vertex to another vertex.

In a further embodiment, the vertices in the join graph of a view represent database tables and the edges represent join conditions between the tables. Additionally, the join conditions may be associated with a particular join type, such as an "inner join" which joins all matching records in two tables, and "outer join" which does not require the two tables to have matching records to be joined. The "outer join" may further be a "left outer join" which joins the records of a left table with the same or null records of the right table, a "right outer join" which joins the records of the right table with the same or null records of the left table, and a "full outer join" which is a combination of a "left join" and a "right join."

In a further embodiment, the join conditions may be in a specified order that is indicated, for example, in join path 315.

In a further embodiment, when a view is attribute view 138, the join graph may be a cyclic graph when the join graph is composed of "inner joins." A cyclic graph is a graph where edges connect vertices in a closed chain.

In an embodiment, the join graph may be modeled as a list 402. List 402 is an input into algorithm 400. In an embodiment, list 402 includes a list of join conditions on different tables and/or indexes in a join path. For example, list 402 may include left and right tables or indexes (such as indexes A, B and C on table1, table2, and table 3 in FIG. 3), a join type (such as an "inner join," "left outer join," "right outer join" and "full join"), and a join predicate (which specifies a join on the tables, such as column from the left table=column from the right table). For example, on line 1 of algorithm 400, the list includes "x", "y", "t", and "cond" parameters, where the "x" and "y" parameters specify the left and right tables or indexes, "t" specifies a join type, and "cond" specifies a join predicate. An example list of a view in FIG. 3 may be "[(B, C, INNER, cond: "b"="c")→(A, B, LEFT OUTER, cond: "a"="b")]".

In an embodiment, list 402 may be an ordered list that specifies an order for joining different components in the join path. When list 402 is an ordered list, algorithm 400 iterates over the parameters of the list in the order specified in join path 315. For example, with respect to the example list "[(B, C, INNER, cond: "b"="c")→(A, B, LEFT OUTER, cond: "a"="b")], algorithm 400 may first iterate over parameters that describe an inner join on tables B and C according to a specified condition (B, C, INNER, cond: "b"="c"), and then over parameters (A, B, LEFT OUTER, cond: "a"="b"). Additionally, algorithm 400 may translate the join of (B, C, INNER, cond: "b"="c") before the join of (A, B, LEFT OUTER, cond: "a"="b"), as specified in join path 315.

In an embodiment, for each iteration in list 402, algorithm 400 determines a nearest common ancestor between the left and right indexes or tables, such as table "x" and table "y", as shown at line 2 in FIG. 4. A nearest common ancestor of two or more nodes in a tree is a node from which the two or more nodes depend, and may be determined by identifying a list of nodes in the tree that are between the two or more nodes. For example, in a binary tree, the list of nodes may be identified using an in-order binary tree traversal, and then the nearest common ancestor node may be selected as the node that appears last using a post-order traversal, in non-limiting embodiment. The in-order and post-order binary tree traversals are well-known in the art.

In an embodiment, when the nearest common ancestor node does not exist, algorithm 400 determines a root node in the join graph that includes the left table "x" (at line 4), and a root node in the join graph that includes the right table "y" (at line 5). A root node is a top most node in the binary tree, and determining the root node in a tree is well known in the art. Once algorithm 400 identifies the root node of the left table "x" and the right table "y" (lines 4-5), algorithm 400 creates a node of a join condition type that joins the root node of the left table "x" and the root node of the right table "y" according to the join type "t" and condition "cond" parameters as shown at line 6. In an embodiment described in lines 4-6 of algorithm 400, algorithm 400 combines two binary trees into a single binary tree. The results of lines 4-6 of algorithm 400 can be seen in tree structure component 308B, where table2 and table 3 are combined into a binary tree via an inner join on predicate B.b=C.c (referred to as table 2-inner join-table 3 tree structure), and also where table 1 is combined with the table 2-left outer join-table 3 tree structure via a left join on predicate A.a=B.b.

In an embodiment, when the nearest common ancestor node exists, algorithm 400 may add a join condition into an existing nearest common ancestor node, as shown at lines 8-9 of algorithm 400. For example, line 8 of algorithm 400 determines whether the nearest common ancestor node is of the same join type as join type "t", and also adds the predicates of the join condition to the ancestor node at line 9. Such scenario may occur when, for example, a nearest common ancestor node may be an intermediate join between two sub-trees (such as an intermediate node of a bushy tree). In a further embodiment, adding a join condition to the nearest common ancestor node may be a result of a cycle case in a cyclic join graph which may occur, for example, in attribute view 140.

In an embodiment, algorithm 400 repeats steps in lines 1-10 for each table "x" and table "y" in list 402, and forms a relational join tree, such as a binary relational join tree. Algorithm 400 then returns the relational join tree as output at line 11, and also as designated by tree 404. In an embodiment, the output may be a root (such as the top node) of the relational join tree.

In an embodiment, algorithm 400 may also keep a loop invariant which maintains a tree that has "N" leaves during the execution of algorithm 400, such that each leaf node is a table. Example leaf nodes in FIG. 3 may be table1, table2, and table 3. In this embodiment, algorithm 400 begins with an N-node forest, which is composed of N trees, where each tree has a single table, as shown in tree structure component 308A. As algorithm 400 proceeds to traverse list 402, algorithm 400 either combines two trees into a single tree (as shown at line 6) or adds a join predicate into an existing intermediate join node (as shown at line 9). When algorithm 400 completes, algorithm 400 generates a single join tree that is shown in tree structure component 308B.

As discussed above, once view converter 212 generates tree 404, which is represented as tree structure 308B, view converter 212 performs requested attributes and key figure conversion 314 and generates tree structure component 308C. Tree structure component 308C includes relational model tree structure 308 of a model view. View converter 212 then passes relational model tree structure 308 to cardinality estimator 210. As discussed above in FIG. 2, cardinality estimator 210 generates cardinality estimation of relational model tree structure 308. In a further embodiment, cardinality estimator 210 generates cardinality estimation using one or more histograms 216. As discussed in FIGS. 3 and 4, relational model tree structure 308 includes a list of relational operators, such as one or more tables, joins, aggregation, and projection operators, in one example. Additionally, each operator in relational model tree structure 308 is attributed by predicates and/or expressions as shown in FIG. 3. In an embodiment, cardinality estimator 210 generates histogram 216 for each attribute in a table, a join, etc., in relational model tree structure 308. To generate one or more histograms 216, cardinality estimator 210 also receives statistics of attributes on each table in relational model tree structure 308. Example statistics include, but are not limited to, a record count, a distinct value count, a null value count, and the minimum and maximum values for attributes in the table.

In an embodiment, cardinality estimator 210 computes one or more histograms 216 for each attribute in relational model tree structure 308 using statistics of the attributes on each table in relational model tree structure 308. To compute one or more histograms 216, cardinality estimator 210 generates one or more histograms 216 for attributes that are in the leaf nodes of relational model tree structure 308. Next, cardinality estimator 210 traverses through each level in relational model tree structure 308 and either modifies one or more histograms 216 or creates additional histograms 216 according to the predicates and/or expressions in each layer of relational model tree structure 308 until cardinality estimator 210 reaches the root of the relational model tree structure 308.

Once cardinality estimator 210 completes generating one or more histograms 216, cardinality estimator 210 provides one or more histograms 216 to cost estimator 208. In an embodiment, cost estimator 208 uses one or more histograms 216 to estimate the cost of each query plan, and select query plan 201 to process the query based on cost.

Figure 5:
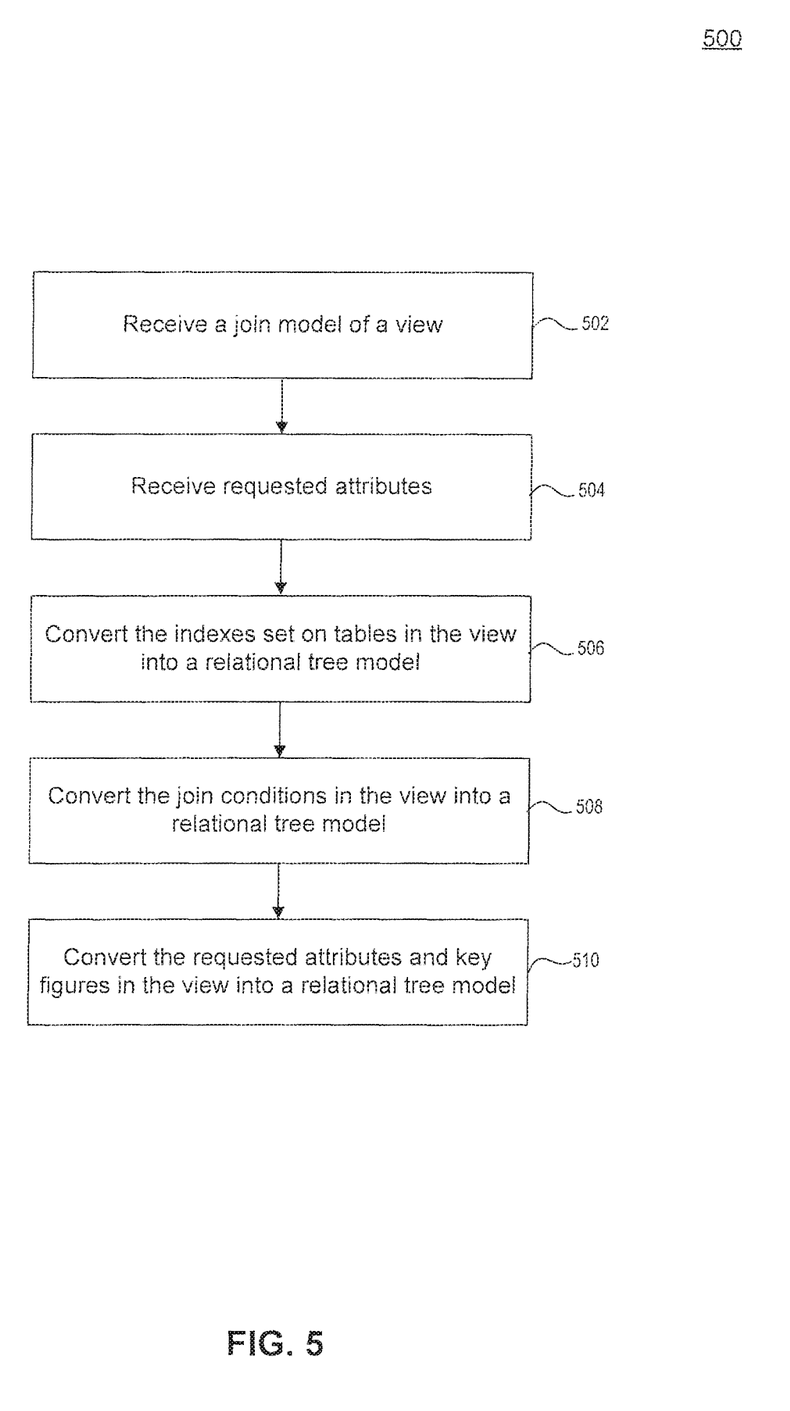
FIG. 5 is a flowchart of a method for converting a model view into a relational join tree, according to an embodiment.

FIG. 5 is a flowchart of a method 500 for converting a model view into a relational join tree, according to an embodiment. Method 500 can be performed by processing logic that can comprise hardware (e.g., circuitry, dedicated logic, programmable logic, microcode, etc.), software (e.g., instructions run on a processing device), or a combination thereof.

In step 502, a join model of a model view is received. For example, view converter 212 receives a join model of attribute view 138 or analytical view 140. As discussed above, attribute view 138 or analytical view 140 may include view definitions 302 for each view.

In step 504, requested attributes are received. For example, view converter 212 receives a query that includes the requested attributes and key figures 304 in the model view.

In step 506, indexes on tables in the model view are converted into a relational tree structure. In an embodiment, indexes on tables may be converted into leaf nodes in relational tree structure 308, and as shown in tree structure component 308A.

In step 508, a join graph is converted into the relational tree structure. In an embodiment, conversion algorithm 400 included in view converter 212 receives list 402 of a join graph. List 402 includes one or more tables, join types, and the join predicates. In a further embodiment, list 402 is an ordered list and includes an order for performing one or more join operations in join path 315. As discussed above, for each join, view converter 212 determines a nearest common ancestor node of two tables "x" and "y". When the nearest common ancestor node does not exist, view converter 212 creates a join node in relational tree structure and joins trees that contain the tables "x" and "y" respectively into a single tree using the created node. The created node also includes a join type and a predicate associated with the join. On the other hand, when the nearest common ancestor node exists, a join condition is added to the nearest common ancestor node. In an embodiment, step 508 repeats for all join conditions in list 402.

In step 510 requested attributes and key figures are converted into the relational tree structure. For example, view converter 212 converts the requested attributes and key figures in the view into relational tree structure, as shown in tree structure component 308C.

Once view converter 212 completes step 510, view converter 212 generates relational tree structure 308 and passes relational tree structure 308 to cardinality estimator 210.

As discussed above, cardinality estimator 212 uses relational model represented as relational tree structure 308 to generate a cardinality estimate in a form of one or more histograms 216, which allow cost estimator 208 to determine cost of query plans and select one query plan 201 to process a query on a model view.

Figure 6:
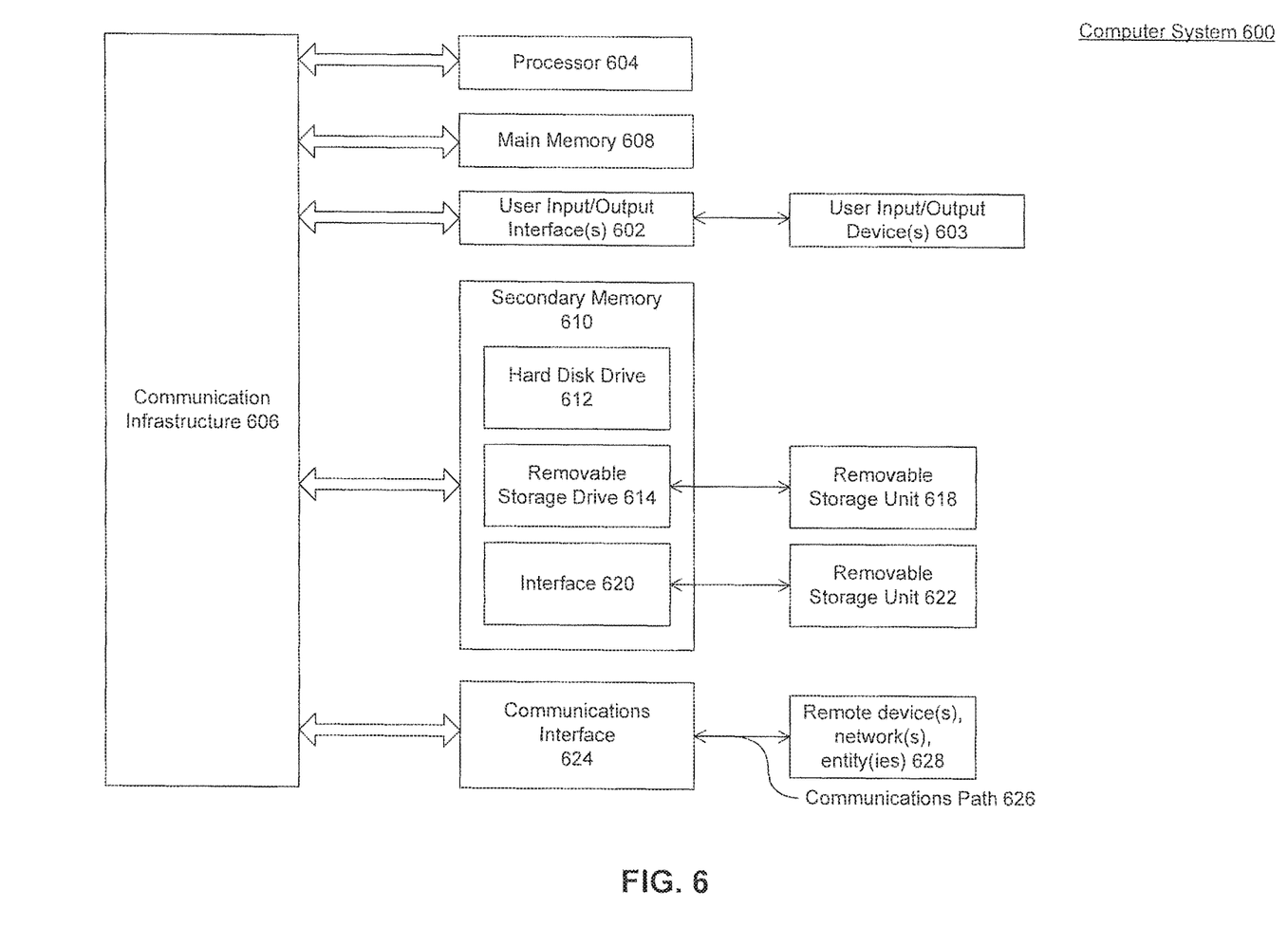
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:

receiving a query to manipulate one or more rows of a table of a database management system;

receiving a join model of a model view set on a first database table and a second database table, wherein the join model is represented by a join graph depending on the first database table and the second database table, the join graph being independent from the received query, the join graph including vertices and edges, the vertices of the join graph represent a first index including a first parameter corresponding to the first database table in a column store that stores relational tables in a column format instead of a row format, and a second index including a second parameter corresponding to the second database table in the column store, and an edge of the join graph represents a join condition between the first database table and the second database table;

performing an index conversion on the join model represented by the join graph to generate a relational model tree representing the join model, the relational model tree being independent from the received query, wherein the index conversion converts the first parameter of the first index into a first leaf node in the relational model tree and the second parameter of the second index into a second leaf node in the relational model tree, and wherein the first index is set on the first database table and the second index is set on the second database table;

performing a join conversion on the join model, wherein the join conversion joins the first leaf node and the second leaf node in the relational model tree by at least a node of the relational model tree connecting the first leaf node and the second leaf node, wherein the node of the relational model tree represents a join condition type and a join predicate including the first parameter of the first index of the first leaf node corresponding to the first database table and the second parameter of the second index of the second leaf node corresponding to the second database table; and generating a cardinality estimate from the relational model tree, wherein the cardinality estimate is in a form of one or more histograms and is used to select a query plan that executes the query on the model view.

2. The computer-implemented method of claim 1, further comprising:

receiving a parameter request by the query, wherein the parameter request includes a parameter from at least one of the first database table and the second database table; and performing a parameter conversion on the join model based on the parameter such that each of the first leaf node and the second leaf node includes the parameter, wherein the join conversion is based on the parameter conversion.

3. The computer-implemented method of claim 2, wherein performing the parameter conversion further comprises:

generating a node in the relational model tree that includes the parameter.

4. The computer-implemented method of claim 2, wherein the parameter includes one or more of an attribute and a key figure.

5. The computer-implemented method of claim 1, wherein the model view is a view of data stored in one or more rows and columns of the first database table and the second database table.

6. The computer-implemented method of claim 1, wherein performing the join conversion further comprises:

generating the node in the relational model tree that stores the join condition type that joins the first leaf node and the second leaf node; and adding the join predicate into the generated node.

7. The computer-implemented method of claim 1, wherein performing the join conversion further comprises:

receiving a list representing the first index, the second index, the join condition type, and the join predicate;

determining a presence of a nearest common ancestor of the first index and the second index, wherein the first index is the first leaf node and the second index is the second leaf node; and generating the node in the relational model tree that joins the first index and the second index, wherein the node includes the join condition type and the join predicate.

8. The computer-implemented method of claim 1, wherein performing the join conversion further comprises:

receiving a list representing the first index, the second index, the join condition type, and the join predicate;

determining an absence of a nearest common ancestor of the first index and the second index, wherein the first index is the first leaf node and the second index is the second leaf node; and including the join predicate into the nearest common ancestor node, wherein the nearest common ancestor node joins the first leaf node and the second leaf node.

9. The computer-implemented method of claim 1, wherein the first database table and the second database table are stored in an in-memory database.

10. The computer-implemented method of claim 1, wherein the relational model tree is a binary tree.

11. The computer-implemented method of claim 1, wherein generating the cardinality estimate further comprises:

generating a histogram from the relational model tree.

12. The computer-implemented method of claim 11, wherein generating the histogram from the relational model tree includes generating the histogram of the first index in the first leaf node of the relational model tree based on an attribute in the first index.

13. The computer-implemented method of claim 1, wherein the model view defines the join graph.

14. The computer-implemented method of claim 13, wherein the join graph is a directed graph.

15. The computer-implemented method of claim 1; wherein each of the first leaf node and the second leaf node comprises a join condition type and a join predicate.

16. A system, comprising:

an in-memory database including a model view set on a first database table and a second database table;

a view converter operable to execute on one or more processors in the in-memory database and configured to:

receive a query to manipulate one or more rows of a table of the system;

receive a join model of the model view such that the join model is represented by a join graph depending on the first database table and the second database table, the join graph being independent from the received query, the join graph including vertices and edges, the vertices of the join graph represent a first index and a second index corresponding to the first database table and the second database table in a column store that stores relational tables in a column format instead of a row format, respectively, and an edge of the join graph represents a join condition between the first database table and the second database table;

perform an index conversion on the join model represented by the join graph to generate a relational model tree representing the join model, the relational model tree being independent from the received query, wherein the index conversion converts the first index and the second index in the join model into a first leaf node and a second leaf node in the relational model tree, respectively, and wherein the first index includes a first parameter corresponding to the first database table, and the second index includes a second parameter corresponding to the second database table; and perform a join conversion on the join model, wherein the join conversion joins the first leaf node and the second leaf node in the relational model tree by at least a node of the relational model tree connecting the first leaf node and the second leaf node, wherein the node of the relational model tree represents a join condition type and a join predicate including the first parameter of the first index of the first leaf node corresponding to the first database table and the second parameter of the second index of the second leaf node corresponding to the second database table; and a cardinality estimator configured to:

generate a cardinality estimate from the relational model tree, wherein the cardinality estimate is in a form of one or more histograms; and select, using the cardinality estimate, a query plan that executes the query on the model view.

17. The system of claim 16, wherein the view converter is further configured to:

receive a parameter request by the query; wherein the parameter request includes a parameter from at least one of the first database table and the second database table; and perform a parameter conversion on the join model based on the parameter such that each of the first leaf node and the second leaf node includes the parameter, wherein the join conversion is based on the parameter conversion.

18. The system of claim 17, wherein the view converter is further configured to:

generate a node in the relational model tree that includes the parameter.

19. The system of claim 18, wherein the parameter includes one or more of an attribute and a key figure.

20. A tangible computer-readable device having instructions stored thereon that, when executed by a computing device, cause the computing device to perform operations comprising:

receiving a query to manipulate one or more rows of a table of a database management system;

receiving a join model of a model view set on a first database table and a second database table such that the join model is represented by a join graph depending on the first database table and the second database table, the join graph being independent from the received query, the join graph including vertices and edges, the vertices of the join graph represent a first index and a second index corresponding to the first database table and the second database table in a column store that stores relational tables in a column format instead of a row format, respectively, and an edge of the join graph represents a join condition between the first database table and the second database table;

performing an index conversion on the join model represented by the join graph to generate a relational model tree representing the join model, the relational model tree being independent from the received query; wherein the index conversion converts the first index and the second index in the join model into a first leaf node and the second leaf node in the relational model tree, respectively, and wherein the first index includes a first parameter corresponding to the first database table, and the second index includes a second parameter corresponding to the second database table;

performing a join conversion on the join model, wherein the join conversion joins the first leaf node and the second leaf node in the relational model tree by at least a node of the relational model tree connecting the first leaf node and the second leaf node, wherein the node of the relational model tree represents a join condition type and a join predicate including the first parameter of the first index of the first leaf node corresponding to the first database table and the second parameter of the second index of the second leaf node corresponding to the second database table; and generating a cardinality estimate from the relational model tree, wherein the cardinality estimate is in a form of one or more histograms and is used to select a query plan that executes a query on the model view.

* * * * *